(12) United States Patent
Siorpaes et al.

(10) Patent No.: US 7,489,659 B2
(45) Date of Patent: Feb. 10, 2009

(54) METHOD AND SYSTEM FOR CONNECTING MOBILE CLIENT DEVICES TO THE INTERNET

(75) Inventors: David Siorpaes, Cortina D'ampezzo (IT); Francesco Gallo, Caneva (IT); Diego Melpignano, Monza (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 722 days.

(21) Appl. No.: 10/503,049

(22) PCT Filed: Jan. 23, 2003

(86) PCT No.: PCT/IB03/00175

§ 371 (c)(1),
(2), (4) Date: Jul. 29, 2004

(87) PCT Pub. No.: WO03/065682

PCT Pub. Date: Aug. 7, 2003

(65) Prior Publication Data

US 2005/0080884 A1    Apr. 14, 2005

(30) Foreign Application Priority Data

Jan. 29, 2002  (EP)  .................................. 02075414
Jul. 11, 2002  (EP)  .................................. 02077785

(51) Int. Cl.
*H04Q 7/00*  (2006.01)
*H04J 3/24*  (2006.01)

(52) U.S. Cl. ........................ 370/331; 370/349; 370/474

(58) Field of Classification Search ......... 370/328–329, 370/331, 338, 349, 352, 353, 465, 466, 469, 370/474; 455/422.1, 436–442, 11.1, 41.2; 709/203, 208
See application file for complete search history.

(56) References Cited

U.S. PATENT DOCUMENTS

2004/0068571 A1* 4/2004 Ahmavaara .................. 709/228
2007/0258457 A1* 11/2007 Sakamoto et al. ........... 370/392

FOREIGN PATENT DOCUMENTS

| EP | 0 917 318 | 5/1999 |
| WO | WO 00 54475 | 9/2000 |
| WO | WO 01 74108 | 10/2001 |

* cited by examiner

*Primary Examiner*—Kwang B. Yao
*Assistant Examiner*—Tung Q Tran (57) ABSTRACT

An arrangement for connecting mobile client devices to the Internet, or other IP based networks, uses WPAN and WLAN infrastructures or certain cellular systems like GPRS. This is achieved substantially seamlessly by providing a routing mechanism (IP-IP Tunnel) that allows mobile client devices to connect to an application server using communications standards depending on the available infrastructure, e.g. GPRS, IEEESO802.11b or Bluetooth wireless standards. The mobile client device and the server are arranged to communicate at a network layer through an Internet Protocol tunneling technique, such that an Internet Protocol address of the mobile client remains the same during a handover from a first communications standard to a second communications standard.

18 Claims, 6 Drawing Sheets

METHOD AND SYSTEM FOR CONNECTING MOBILE CLIENT DEVICES TO THE INTERNET

The present invention relates to Internet Protocol (IP) based communication arrangements and in particular, but not exclusively, to an Internet Protocol based communication arrangement in which an Internet Protocol compatible network can be accessed substantially seamlessly using a plurality of communications standards.

Connectivity to the Internet, or another IP-based network, can be achieved by client devices such as Personal Digital Assistants (PDAs), laptops and mobile phones using different access networks such as Wireless Local Area Networks (WLAN), Wireless Personal Area Networks (WPAN) or cellular systems like Generalized Packet Radio System (GPRS).

The rapid diffusion of wireless access technologies (IEEE802.11, Bluetooth™ and GPRS) makes it possible for portable/mobile client devices like PDAs to be connected to services on the Internet while in an office or on the move. While combined products like WLAN/GPRS cards are appearing, seamless roaming across different technologies is still uncommon.

Some devices do, however, already have the capability of using more than one wireless communications standard or network to gain access to the Internet. One example is a GPRS phone with Bluetooth support: when used inside a building, Bluetooth network access points can forward traffic between the mobile phone and the Internet, while the GPRS standard offers the same functionality outdoors at a lower speed. This trend is predicted to continue, as more wireless standards are likely to become available that offer diversified characteristics and costs. The Internet or other IP-based networks will thus be accessed by a variety of wireless devices that need to be connected and reachable.

The Internet Engineering Task force (IETF) is developing protocols for mobility of Internet hosts, as discussed in:
(1) IETF Mobile IP WG, http://www.ietf.org/html.charters/mobileip-charter.html
(2) K. El Malki et al., "Low Latency Handoffs in Mobile IPv4", http://www.ietf.org/internet-drafts/draft-ietf-mobileip-lowlatency-handoffs-v4-03.txt (work in progress)
(3) G. Dommeti et al., "Fast Handovers for Mobile IPv6", http://www.ietf.org/internet-drafts/draft-ietf-mobileip-fast-mipv6-03.txt (work in progress).

These proposals are not finalized at the time of writing. Furthermore, the above protocols (Mobile IP and its improvements) will have to rely on lower layer capabilities, which are not standardized either. Mobile IP (1) is a protocol to support network mobility. Its main features are:

1) Transparency for upper layer.
2) Interoperability with IPv4: an application can transmit data to another one using IPv4 addresses only.
3) Scalability: Mobile IP can work with a small LAN or a large WAN.
4) Security: this protocol provides some instruments to authenticate the message and protect the data on the network.
5) Macro-mobility: it works when the mobile terminal movements are not frequent, for instance it cannot efficiently support a mobile terminal that changes its access point every three minutes (typical value of GSM system).

Mobile IP has been designed for large-scale mobility and is hence too complex to fit the needs of some vertical markets, e.g. where the application provider controls access to its services including authentication and authorization of clients.

Generally speaking, mobility increases security risks that are already intrinsically present in the wireless access and in the Internet architecture. The terminal should ideally prevent unauthorized access to the server as well as attacks that result in denial of service. MIPv4 is not considered a secure solution since it is relatively easy to fake location binding updates, causing the traffic to be unduly redirected to a different client. Security can be enforced at different layers, from the link to the application layer, with different implications on the systems architecture, overall performance and complexity.

It is an object of the present invention to provide improved Internet Protocol based communication arrangements and in particular, but not exclusively, to provide an efficient arrangement for mobile devices to switch from one network access standard to another depending on the available network infrastructure (either wireless or wired).

Accordingly, the present invention provides a communications system comprising:
a) an Internet Protocol compatible communications network;
b) a client device arranged in use to connect to said network in accordance with one of a plurality of communications standards and to change between said communications standards under predetermined circumstances; and
c) a server arranged in use to couple to said network so as to communicate with said client device,
wherein said client device and said server are arranged in use to communicate at the network layer through an Internet Protocol tunneling technique, such that an Internet Protocol address of said client device remains the same during a handover from a first said communications standard to a second said communications standard. Said communications standards may be wireless or wired standards and said client device may comprise a mobile or portable device.

Said Internet Protocol tunneling technique may differentiate between an Internet Protocol address used to connect said client device to a subnet and an Internet Protocol address used to connect said client device to said server.

Said Internet Protocol tunneling technique may encapsulate one Internet Protocol datagram within another Internet Protocol datagram.

A server endpoint of said Internet Protocol tunneling technique may be substantially fixed and a client device endpoint may be changeable as a result of roaming.

Said Internet Protocol tunneling technique may maintain one Internet Protocol address for applications and may rely on dynamically allocated Internet Protocol addresses for carriage of traffic.

Network structure of bearers of at least two said communications standards may be generally unrelated.

A said predetermined circumstance initiating a said change between said standards may comprise at least one of usage cost, bandwidth availability, received signal strength, link quality, link availability, signal-to-noise ratio, power consumption or explicit user intervention.

A transition between two said communications standards may be performed with reconfiguration of the network layer.

A link layer handover for each of two said communications standards, between said client device and a network unit such as an access point, may be unrelated at the driver level and said link layer handover may be performed independently for each said standard.

Said client device may be automatically assigned a new Internet Protocol address during a vertical handover between two said communications standards, for example during inter-subnet roaming.

Preferably, no new Internet Protocol address may be assigned to said client device in the event that the or each network access point used by said client device before and after a said vertical handover between two said communications standards belong to the same Internet Protocol subnet. For example, in the event of intra-subnet roaming or in the event of a switch between a Wireless Personal Area Network (WPAN) and a Wireless Local Area Network (WLAN). When access points belong to the same LAN segment, the IP address of the device preferably remains unchanged.

Said system may further comprise a routing manager adapted to monitor which one or more of said communications standards is available for use and to make decisions on switches between communications standards used based on said monitoring.

Said routing manager may make a said decision on the basis of at least one of an input from a lower layer, on the location of said client device or on user requirements.

Each said communications standard may access said network through an individual interface and said routing manager may be adapted to deactivate one or more of said interfaces at least temporarily under predetermined conditions, for example to achieve a power saving.

Said system may further comprise a security arrangement adapted to allow only authorized client devices to access said network, said security arrangement preferably including one or more of the following:
  a) applications based on a secure data transfer such as Secure Socket Layer (SSL);
  b) location updates protected using secure data transfer such as Secure Socket Layer (SSL) applied to HyperText Transfer Protocol messages (HTTPS);
  c) access to the network is controlled, e.g. involving user authentication and/or verification, an example would be access points connected to a RADIUS server and GPRS SIM card based security; and
  d) firewalls used whenever access networks for a said communications standard need to connect to the Internet, or other Internet Protocol based networks.

A said communications standard may define a wireless access protocol. The wireless access protocol may be based on any suitable wireless access system, e.g. Frequency Division Multiple Access (FDMA), Code Division Multiple Access (CDMA), Time Division Multiple Access (TDMA), Time Division Duplex (TDD), Orthogonal Frequency Multiple Access (OFDMA) or combinations of these such as CDMA/FDMA, CDMA/FDMA/TDMA, FDMA/TDMA. As a specific example, one of IEEE 802.11b, Bluetooth and GPRS may be selected.

The present invention also provides a method of performing communication in an Internet Protocol compatible network, the method including:
  a) coupling a client device to said network in accordance with one of a plurality of communications standards and changing between said communications standards under predetermined circumstances;
  b) coupling a server to said network for communicating with said client device; and
  c) communicating between said client device and said server at the network layer through an Internet Protocol tunneling technique, keeping an Internet Protocol address of said client device the same while handing over from a first said communications standard to a second said communications standard. Said communications standards may comprise wireless or wired standards.

The present invention also provides a software product having encoded thereon an executable program adapted to enable implementation of a method including the steps recited above in the method of the invention.

The present invention also provides a client device for use in a system according to the present invention or in a method according to the present invention, said client device being adapted to communicate with said server in accordance with one of a plurality of communications standards and to change between said standards under predetermined circumstances, said communication being performed by means of an Internet Protocol tunneling technique, said client device preferably comprising a mobile terminal such as a Personal Digital Assistant (PDA), a lap-top computer or a mobile telephone.

The present invention also provides a server, for use in a system according to the invention or in a method according to the invention, said server being adapted to communicate with one or more said client devices in accordance with one of a plurality of communications standards and to control changes between said standards under predetermined circumstances, said communication being performed by means of an Internet Protocol tunneling technique.

The present invention will now be described with reference to certain embodiments and with reference to the above mentioned Figures. Such description is by way of example only and the present invention is not limited thereto. The term "comprising", e.g. in the claims, does not exclude other elements or steps and the indefinite article "a" or "an" before a noun does not exclude a plurality of the noun unless specifically stated. With respect to several individual items, e.g. a channel decoder, channel equalizer, or items given an individual function, e.g. a channel decoding means, channel equalizing means, the invention includes within its scope that a plurality of such items may be implemented in a single item, e.g. in a processor with relevant software application programs to carry out the function.

In the present invention reference is made to a client device arranged in use to connect to a network in accordance with one of a plurality of communications standards. The term "plurality of communications standards" when referred to a client device means to a skilled person a multi-mode terminal. Such a multi-mode terminal could be a PDA with a so-called combination chipset or "combo" card, i.e. a card that provides the functionality to the device of Bluetooth, IEEE802.11b and GSM/GPRS transceivers. A "standard" used in communications arrangements may comprise a technical guideline advocated by a recognized organization, which may comprise for example a governmental authority or noncommercial organization such as the IETF, ETSI, ITU or IEEE, although not limited thereto. Standards issued or recommended by such bodies may be the result of a formal process, based for example on specifications drafted by a cooperative group or committee after often intensive study of existing methods, approaches and technological trends and developments. A proposed standard may later be ratified or approved by a recognized organization and adopted over time by consensus as products based on the standard become increasingly prevalent in the market. Such less formal setting of a "standard" may further encompass technical guidelines resulting from implementation of a product or philosophy developed by a single company or group of companies. This may particularly be the case if, through success or imitation, such guidelines become so widely used that deviation from the norm causes compatibility problems or limits marketability. The extent to which a piece of hardware conforms to an accepted standard may be considered in terms of the extent to which the hardware operates in all respects like the standard on which it is based or designed against. In reference to software, compatibility may be considered as the harmony achieved on a task-orientated level among computer elements and programs. Software compatibility to a standard may therefore also be considered the extent to which programs can work together and share data.

Referring to the Figures, according to the present invention a user equipment is provided with mobility, i.e. it may be represented by a mobile terminal MT, able to connect to a well-known and properly configured server 10 through multiple communications standards, as might be found in certain vertical market contexts (e.g. financial institutes). The wireless access protocol may be based on any suitable wireless access system, e.g. Frequency Division Multiple Access (FDMA), Code Division Multiple Access (CDMA), Time Division Multiple Access (TDMA), Time Division Duplex (TDD), Orthogonal Frequency Multiple Access (OFDMA), Coded Orthogonal Frequency Multiple Access (COFDMA) or combinations of these such as CDMA/FDMA, CDMA/FDMA/TDMA, FDMA/TDMA systems. As a specifically useful example, one of IEEE 802.11b, Bluetooth and GPRS may be selected. It will also be appreciated, however, that other wireless or wired standards (Ethernet, Token Ring) may be employed. General information on wireless protocols may be found in "OFDM for wireless multimedia communications", by Richard van Nee and Ramjee Prasad, Artech House, 2000; Wideband CDMA for third generation mobile communications", by Tero Ojanperå and Ramjee Prasad, Artech House, 1998, "Personal Wireless Communication with DECT and PWT", by John Phillips and Gerard Mac Namee, Artech House, 1998, CDMA for wireless personal communications", by Ramjee Prasad, Artech House, 1996; Cordless telecommunications Worldwide", by Walter Tuttlebeee, Springer, 1997 and similar standard texts.

The present invention provides a routing solution for seamless standards switching between different interfaces on the client device MT. The problem involves up to three OSI layers (PHY, Link Layer and Network). The embodiments discussed herein will concentrate on mobility support in a restricted scenario in which control by the service provider reaches, besides the client device MT equipped with the three above-mentioned standards, an end server 10 from where data contents are retrieved or where proxy techniques can be implemented. This server 10 may then provide full access to the Internet or other IP-based network, along with billing, collection of statistics, firewalling and authentication.

In a typical embodiment, the server can be reached using Wireless LAN infrastructure or Bluetooth access points while in the corporate office, or cellular access like GPRS or UMTS while on the move. The client device may be a mobile terminal in the form of a Personal Digital Assistant (PDA) or PocketPC™, in which case Bluetooth access may be preferable to WLAN because of power consumption issues while GPRS can always be an available backbone where no other access points provide radio coverage. The network that connects the access points in the corporate scenario may include several IP subnets connected together by routers (optionally by a Virtual private Network (VPN) on the public Internet). The point of connection of the corporate network to the Internet (ingress router) is preferably always protected by one or more software and/or hardware firewalls and the mobile terminal should preferably take consequent limitations into account without requiring any special policy in the firewall configuration. In the corporate infrastructure, a RADIUS server may be used to control access of mobile terminals. It is also assumed that a DHCP infrastructure may be deployed, so that mobile terminals can be assigned a leased IP address. In the user's terminal, the criteria used to select one wireless access technology instead of another may vary depending on usage scenarios. The user may for example set his preference using a dedicated configuration tool in the mobile terminal.

Figure 1:
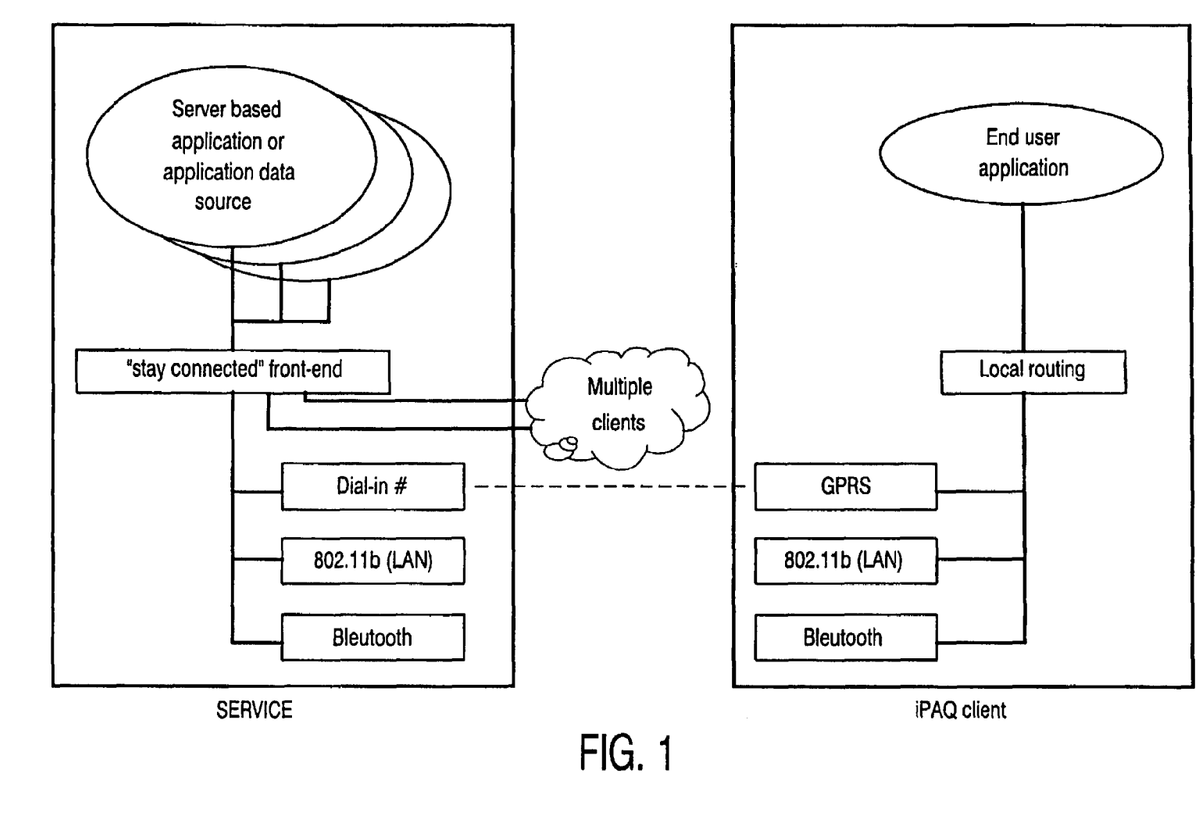
FIG. 1 is a schematic overview of a communications system according to an embodiment of the invention.

Referring now in particular to FIG. 1, a client device that is under the control of a mobile end user is equipped with a number of three different wireless technologies: IEEE 802.11b, Bluetooth and GPRS, that is it is a multi-mode user equipment. The client device has mobility and is preferably portable by the user and will be referred to for convenience as a mobile terminal MT. The skilled person will appreciate that for mobility, portability is not a necessary requirement. On the mobile terminal MT, applications such as web browsers connect via a communications protocol, especially a layer 1 or layer1/layer2 protocol, e.g. a standard TCP/IP protocol, to a fixed server 10 that is under administrative control by a service provider. Depending on predetermined conditions, which might include location, bandwidth requirements and power consumption, the mobile terminal MT may want or need to switch between these plurality of different wireless interfaces, or such interfaces as might be appropriate for a different wireless or wired standards being used for this embodiment.

Bluetooth™ is indicated when low power requirements are the main constraint and when mobility area is bounded, e.g. to an office environment. A useful discussion of Bluetooth™ communications can be found in text book form in "Bluetooth™, Connect Without Wires" by Jennifer Bray and Charles F. Sturman, published by Prentice Hall PTR under ISBN 0-13-089840-6.

IEEE 802.11b is more suitable when wider access is needed in office or building neighborhoods and higher bandwidth is desirable. General information on wireless LAN protocols and systems may be found in "Wireless LANS", by Jim Geier, Macmillan Technical press, 1999. When wireless LAN resources are not available, (e.g. neither Bluetooth™ nor IEEE 802.111b), then GPRS connectivity must be used.

The present invention allows seamless transition between these wireless technologies without the need for upper layer reconfiguration and preferably without affecting performance significantly. This means the following is preferably implemented:

(i) Vertical handover support (Link Layer mobility)
(ii) IP Mobility support (Network mobility).

IP mobility support is currently the subject of intense research and many proposals have been discussed in standardization groups. Up until now, however, none of them have gained widespread acceptance and none are available universally to date. To this end, it is proposed to offer a solution that involves only the mobile terminal MT and the server 10. The intermediate network does not require special or extra features to implement the present invention, except for ordinary automatic network configuration protocols such as DHCP and PPP dynamic address configuration for GPRS.

Figure 2:
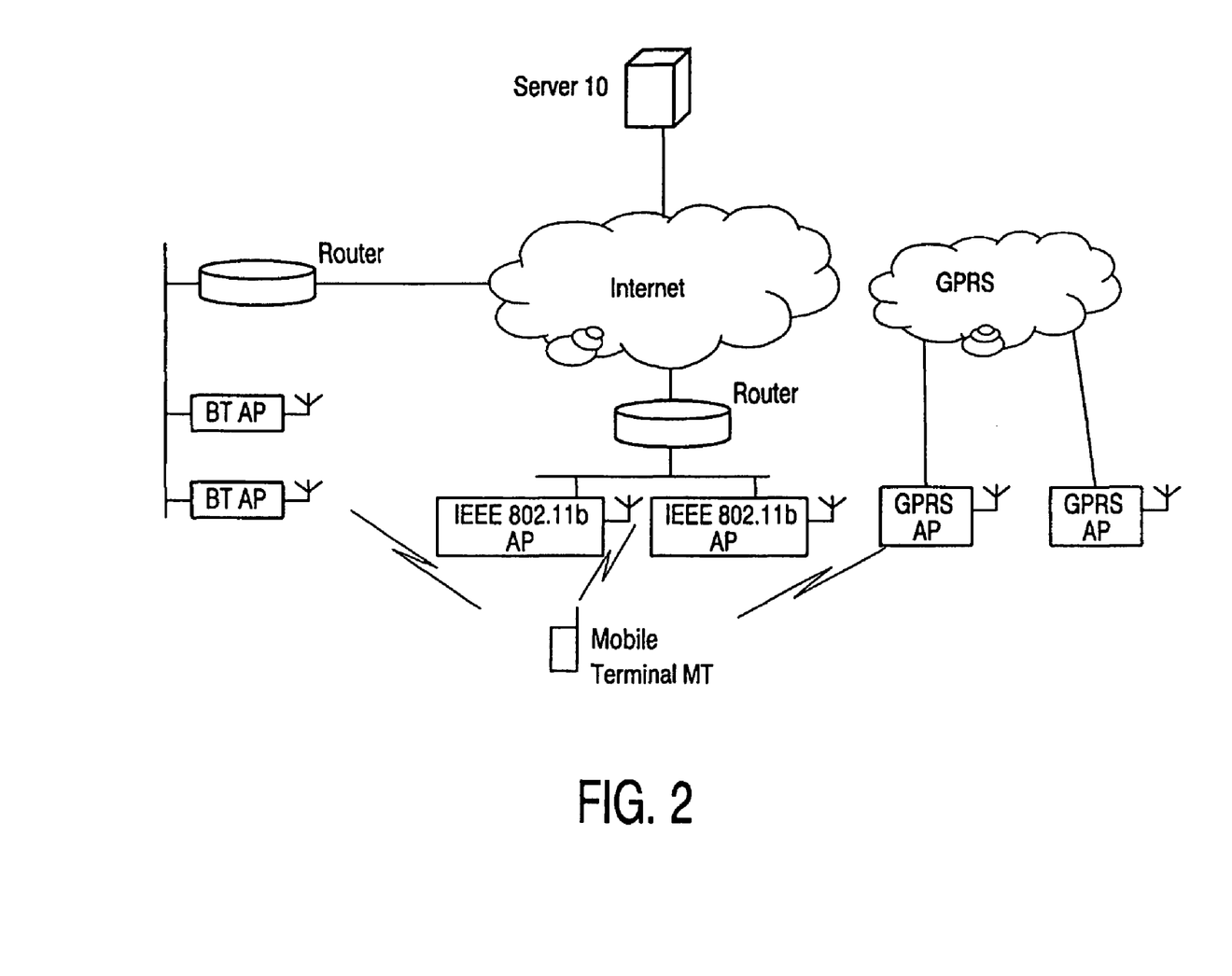
FIG. 2 is a block diagram of the system of FIG. 1.

Referring now also to FIG. 2, a mobile terminal MT wants to connect to the Internet or other IP-based network while moving among areas covered by WPAN, WLAN and cellular systems. With reference to the term "LAN" it will be appreciated by the skilled person that any of the embodiments of the present invention may be implemented with a shared resources network of which LAN (Local Area Network), MAN (Municipal Area Network), WAN (Wide Area Network), PAN (Personal Area Network), CAN (Controller Area Network) are all examples and are included within the scope of the present invention. Once the mobile terminal MT has an ongoing session with a server in the network, the session must not be interrupted when the mobile terminal MT switches from one access system to another. Existing TCP/IP sessions must be prevented from stalling, e.g. stopping such that user intervention is needed to resume. When the vertical handover is performed, the mobile terminal MT will most likely be assigned a new IP address, except in the particular case of a WPAN/WLAN switch where access points AP belong to the same IP subnet. It can be noted here that a portion of a network that shares a common address component may be referred to as such a subnet. On TCP/IP networks, subnets are defined as all devices whose IP addresses have the same prefix.

The problems to solved by the present invention can therefore be summarized by the points below:
1. sensing the presence of a different wireless network infrastructure;
2. deciding when to perform the vertical handover;
3. reconfiguring the wireless hardware so that the new wireless infrastructure is used;
4. registering with the new network (including AAA);
5. getting a new IP address, if necessary;
6. handling the routing of IP packets through the new access network and access point AP through proper signaling at the network layer;
7. reconfiguring the wireless network interface so that the new standard is used to connect to the Internet and the new IP address is used; and
8. security protection should guarantee that only authorized devices can use the service and should also prevent all denial of service attacks. Only authorized clients should be allowed to access the service and, once connected, they should be protected against eavesdropping, redirection of traffic, man-in-the-middle and as many other kinds of security attacks as possible.

The present invention focuses on the routing issues of the client/mobile device and on security (points 3, 4, 5 and 8), basically at the network layer of the OSI protocol stack. An assumption is made that the lower layers, i.e. the wireless network interfaces, are supporting the remaining points.

Generally speaking, handover techniques for devices that exploit the Internet protocols concern the Link and the Network OSI levels. These give rise to two different mobility problems that will be treated separately. In a scheme according to an embodiment of the present invention, a mobile terminal MT can connect to a server 10 located in the Internet or other IP based network by means of a plurality of wireless technologies, which in this embodiment are, for instance: Bluetooth™, IEEE802.11b and GPRS. The network structures of the three bearers are generally unrelated. This holds true for GPRS, while Bluetooth™ and IEEE802.11b may coexist on the same core network.

Link Layer Mobility

With regard to Link Layer mobility, Link Layer handover among units (MT, AP) configured with the same wireless technology is assumed to be already implemented by the underlying technology. More precisely:
(1) Bluetooth™: Bluetooth Link Level mobility between Bluetooth access points is being standardized and will be part of a future version of the PAN profile.
(2) IEEE 802.11: The IEEE standard specifies the basic message formats to support roaming at the link layer, but everything else is left up to network vendors.
(3) GPRS: Roaming within GSM cells is entirely managed by the service bearer and the mobile terminal MT is considered to be "Always ON".

These three handover solutions are completely unrelated to each other at the driver level and they work independently. Switching between different technologies (Vertical Handover) is necessary when the mobile terminal MT enters an area that provides a more convenient technology in terms of cost, bandwidth or power requirements, or when the technology that is being used is no longer available (e.g. out of range). So, these two things have to be defined:

Link availability test procedures.
Technology switching policies.

Regarding the first point, techniques that could allow access point detection have to be introduced. Some agent able to constantly monitor different technologies availability and inform the appropriate software module has to be deployed. The technologies involved are very different and the link availability test procedure problems are hence addressed in completely different ways.

Regarding the second point, technology switching is performed according to link quality and availability, together with other parameters such as power consumption constraints. The assumption is made that each wireless interface can be in one of two states, ON or OFF and that it is possible to query the radio link quality and retrieve parameters such as the received signal strength or signal-to-noise ratio or other indicators. A dedicated agent (RM: Routing Manager) just above the driver decides which technology has to be used on the basis of the inputs from the lower layers, on the location of the device and/or on user requirements. The Routing Manager RM may also decide to temporarily de-activate some wireless interfaces for power saving. The present invention proposes the allocation of a distinct interface for each of the three wireless devices. As will be seen later, this solution simplifies some of the issues that arise when dealing with the network mobility.

In the simplest scenario, access points AP of the same radio technology are located on the same subnet. Eventually, Bluetooth and 802.11 access points AP share the same LAN. More complicated environments that include multiple subnets are much trickier to manage because of the need for higher network mobility protocols that are described in the following sub-section.

Network Mobility

In a scenario involving roaming with multiple wireless technologies available, four scenarios can be identified:
1. Intra-Subnet homogeneous roaming.
2. Inter-Subnet homogeneous roaming.
3. Intra-Subnet heterogeneous roaming.
4. Inter-Subnet heterogeneous roaming.

Intra-Subnet roaming exists if the mobile terminal MT remains bounded within the same IP subnet i.e. the access points AP and the mobile terminal MT roaming between them belong to the same IP subnet and behave like bridges. In this case, the mobile terminal MT is not assigned a new IP address when its network attachment point changes. Inter-Subnet roaming exists if the contrary holds.

Homogeneous roaming means that there is no technology switching involved, i.e. the bearer does not change during the handover. Heterogeneous roaming requires wireless technology switch during handover.

The different roaming categories are summarized by the table below, together with the actions performed in each case by the mobile terminal MT.

TABLE 1

Handover categories

| | INTER-SUBNET | INTRA-SUBNET |
|---|---|---|
| HOMOGENEOUS (HANDOVER) | Link_Request_ Access (MT) DHCP_Discover (MT) DHCP_Request (MT) Config IP Address (MT) Configure Tunnel (MT, SERVER) | Link_Request_ Access (MT) DHCP_Discover (MT) |
| HETERO- GENEOUS (VERTICAL HANDOVER) | Link_Request_ Access (MT) DHCP_Discover (MT) DHCP_Request (MT) Config IP Address (MT) Configure Tunnel (MT, SERVER) | Link_Request_ Access (MT) DHCP_Discover (MT) DHCP_Request (MT) Config IP Address (MT) Configure Tunnel (MT, SERVER) |

Intra-subnet homogeneous handover requires no reconfiguration of network protocols, since the bearer lower layers solve the handoff at the link layer.

Inter-Subnet homogeneous roaming is somewhat more complex: level two roaming is again performed by the bearer as before, but there is now the need to re-configure the client's IP address in order to be able to communicate within the new subnet. A new IP address therefore has to be assigned automatically to the mobile terminal MT. While a new IP address allows communication towards the new subnet, the end-to-end IP communication between the mobile terminal MT and the server 10 is severely affected, since applications cannot have knowledge of the mobile's IP address change, neither at the mobile side nor at the server side. In this case IP connectivity is lost and running applications must be restarted in order to communicate with the new IP address. Solutions that are able to maintain the same mobile terminal IP address even when performing Inter-Subnet roaming should preferably be found.

Intra-Subnet heterogeneous roaming does not need IP reconfiguration since access points AP are configured as bridges, but a technology switch causes the MAC address of the wireless card used in the mobile terminal MT to change. This may necessitate refreshing the mobile terminal's ARP entry on the first-hop router ARP table. Also the link Maximum Transmission Unit (MTU) may change.

Inter-Subnet heterogeneous roaming is similar to the second scenario, except that the underlying technology changes. The problem from the network layer point of view is however the same.

A Proposed Embodiment of the Present Invention

If the mobile terminal MT moves within the same subnet only, no problems arise since its IP address does not need to change and end-to-end communication with the server 10 is always possible. When switching between two technologies, the MAC address of the network interfaces changes.

Network layer roaming gets difficult when the mobile terminal MT crosses different subnets, either maintaining the same technology (homogeneous) or switching between two different technologies (heterogeneous). In fact, when mobile terminal MT moves between access points AP that serve two different IP subnets, two mandatory requirements clash with each other:

1. The mobile terminal MT needs to obtain a new IP address to participate in the new subnet.
2. The mobile terminal MT needs to maintain same IP address to keep connectivity with the server 10 (as seen by the application).

Differentiating between the IP addresses used to connect to the subnet and the IP address used to connect to the server 10 and using the so-called "IP in IP tunneling" the problem can be solved. This technique includes encapsulating an IP datagram in another IP datagram. Before illustrating the solution the following terminology should be introduced for IP addresses:

IP_BEARER. This is the IP addresses that the wireless connectivity bearer automatically assigns to the mobile terminal MT.

IP_CLIENT: Belongs to the mobile terminal MT. The IP address the applications communicate with. It is assigned by the server 10 and never changes during roaming or switching.

IP_SERVER: Belongs to the server. It is the address the applications use to communicate with the client MT.

IP_TEP: Belongs to the server. The valid IP address the server is seen on the Internet or other IP network as the case may be.

Figure 3:
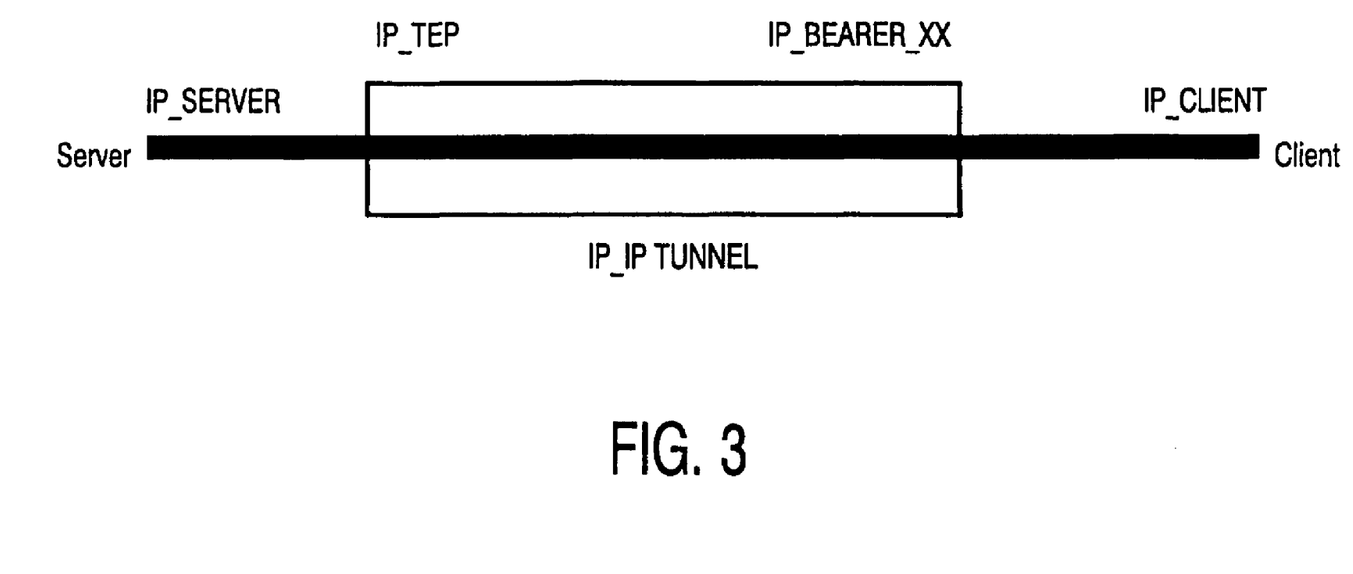
FIG. 3 is a schematic diagram of an Internet Protocol tunneling technique (IP-IP Tunnel) employed in an embodiment of the present invention.

Their role in the IP-IP tunnel is depicted in FIG. 3. The idea is to maintain application connectivity by means of the IP_CLIENT and IP_SERVER, which never change. The server 10, using a special protocol, assigns IP_CLIENT to the mobile. Traffic between these two addresses is carried (or "encapsulated") in the IP communication between the tunnel end points. Server endpoint IP_TEP is fixed, while client MT end-point may change as a result of Inter-Subnet roaming. Using this approach, it is possible to maintain the same IP address for applications, and rely on dynamically allocated IP addresses for traffic carrying.

Figure 4:
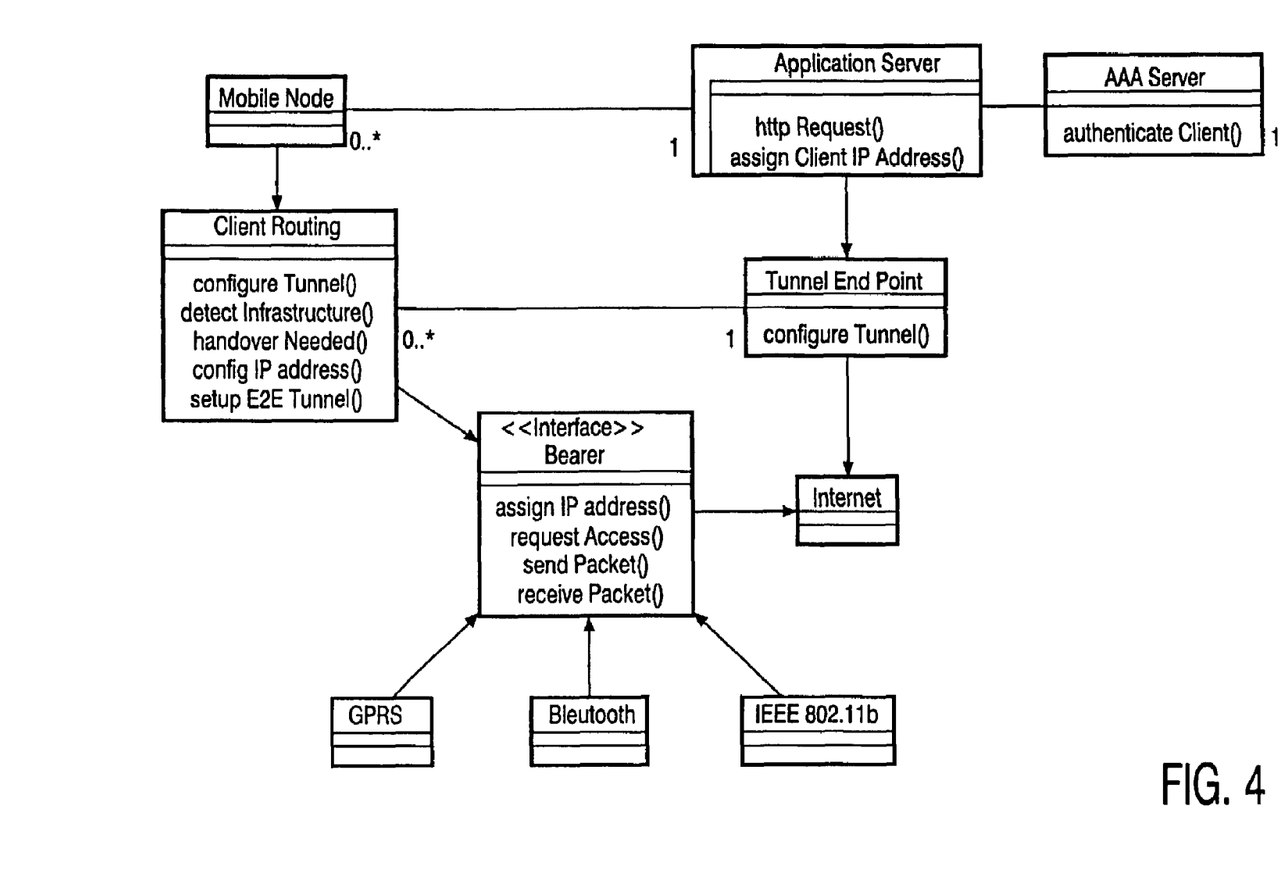
FIG. 4 is a class diagram of the main functional blocks in a system according to an embodiment of the present invention.

In FIG. 4, a class diagram of the main functional blocks of the target system is depicted using standard Unified Modeling Language (UML) notation. The main classes, their methods as well as class relationships are shown. This diagram shows the main classes of the client-server system and is intended for the sole purpose of describing the main functional blocks of a design according to an embodiment of the present invention. On the left side are found the main client classes, the MobileNode, which represents the application and the ClientRouting class, which embeds all the functionality to handle the network and DLC layer issues, e.g. the IP-IP tunneling and the detection and management of available wireless infrastructures. In fact, this class exports methods to request access to a wireless network, to detect when a handover is needed, to receive information from the server 10 to setup the IP-IP tunnel and to actually configure tunneling.

On the right side of FIG. 4, the server side classes are depicted; in particular the ApplicationServer, the TunnelEndPoint and the AAAServer. The first is usually a Web server that is also able to run scripts and generate dynamic Web pages, but may also include features like e-mail exchange server or database access. The TunnelEndPoint class is used to set-up IP tunnel with mobile clients MT, while the AAAServer class performs Authentication, Authorization and Accounting of the mobile clients. It also assigns IP addresses that can be used by clients throughout a session. In the present embodiment it is suggested to use a simple Web-based AAA server, which controls the activation and configuration of the Tunnel Endpoint for a specific client. The other classes represent the Wireless access networks (e.g. Bluetooth, IEEE802.11 and GPRS), which all implement the Bearer interface. Finally an Internet class is also shown.

The relationships among classes can be read as follows (from left to right). The MobileNode class uses ClientRouting to access a Bearer. The Bearer uses the Internet to connect to the TunnelEndPoint, which is used by the ApplicationServer. An AAAServer is associated with the a Tunnel Endpoint.

The Mobile Terminal that wants to access the system contacts the AAAServer by requesting a specific dynamic Web page, the request being protected with SSL. An access script is then executed to control the client access rights. This step may include the authentication server to contact a specific database. Upon successful client authentication, the AAAServer contacts the Tunnel Endpoint by means of a proprietary protocol and sets up the tunnel for the authenticated client. Finally the AAAServer returns a Web page to the client to indicate that the process has successfully completed. In this page the application IP address is returned as well, which the ClientRouting class can pick to setup the tunnel on the mobile terminal.

Dynamic behavior of objects that implement these classes is detailed below by means of sequence diagrams for two cases:

1. initial access of the mobile node to the service; and
2. change of the wireless access network that is used by the mobile node to access the server through the Internet (i.e. the vertical handover itself).

Initial Access to the Server

Figure 5:
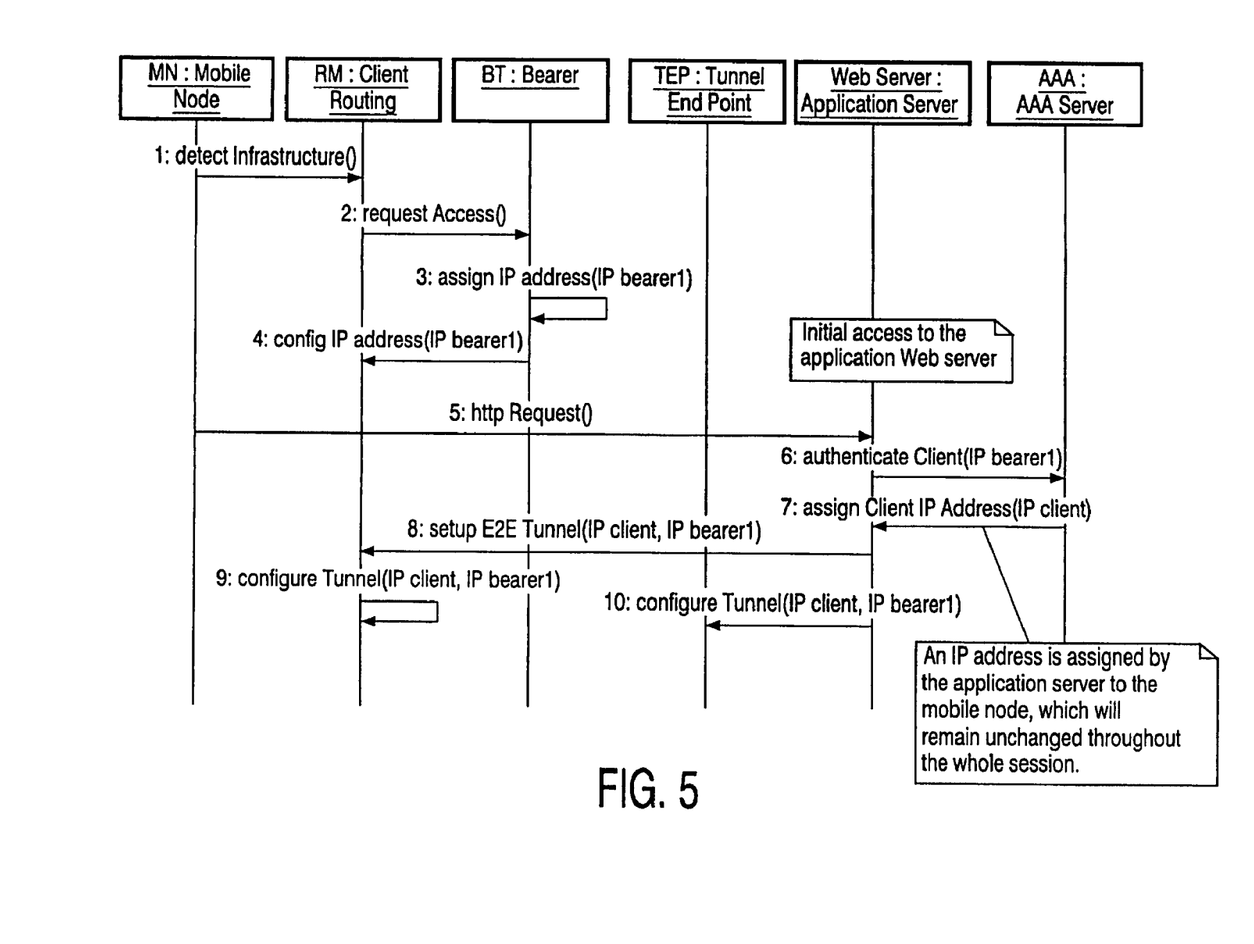
FIG. 5 is a sequence diagram of initial access by a client device to a server of the system of FIG. 1.

Initial access to the server is shown in the time sequence diagram depicted in FIG. 5 and includes the steps outlined below.

1. Mobile terminal Link Layer detects wireless infrastructure (e.g. Bluetooth, IEEE802.11 or GPRS) availability. Bluetooth is used in the example.
2. Mobile terminal MT requests an IP_BEARER address by means of the DHCP protocol or PPP in case of GPRS.
3. Bearer's wireless infrastructure examines the request and offers host configuration information to the mobile terminal MT.
4. Mobile terminal MT configures its wireless interface with the data provided by the wireless infrastructure. Mobile terminal MT is now able to establish direct communication with the server 10 with its newly assigned IP_BEARER address.
5. Mobile terminal MT sends an HTTP request to the well-known AAAServer web server's address, using its new IP_BEARER.
6. the AAA Server analyses the request and identifies the mobile terminal MT by means of an authentication protocol.
7. If authentication succeeds, the IP_CLIENT address is computed and assigned to the mobile client.
8. Server tunnel is set up
9. End to end tunnel configuration is sent to the RM and
10. Mobile terminal's tunnel is set up.
11. Server's tunnel is set.

After the tunnel has successfully been set up, communication between the mobile terminal MT and the server 10 takes place between the fixed IP_CLIENT and IP_SERVER. When subnet switching is then performed, the tunnel end-points of the client MT and the server TEP are reconfigured while the IP_CLIENT address remains constant.

Execution of a Vertical Handover

Figure 6:
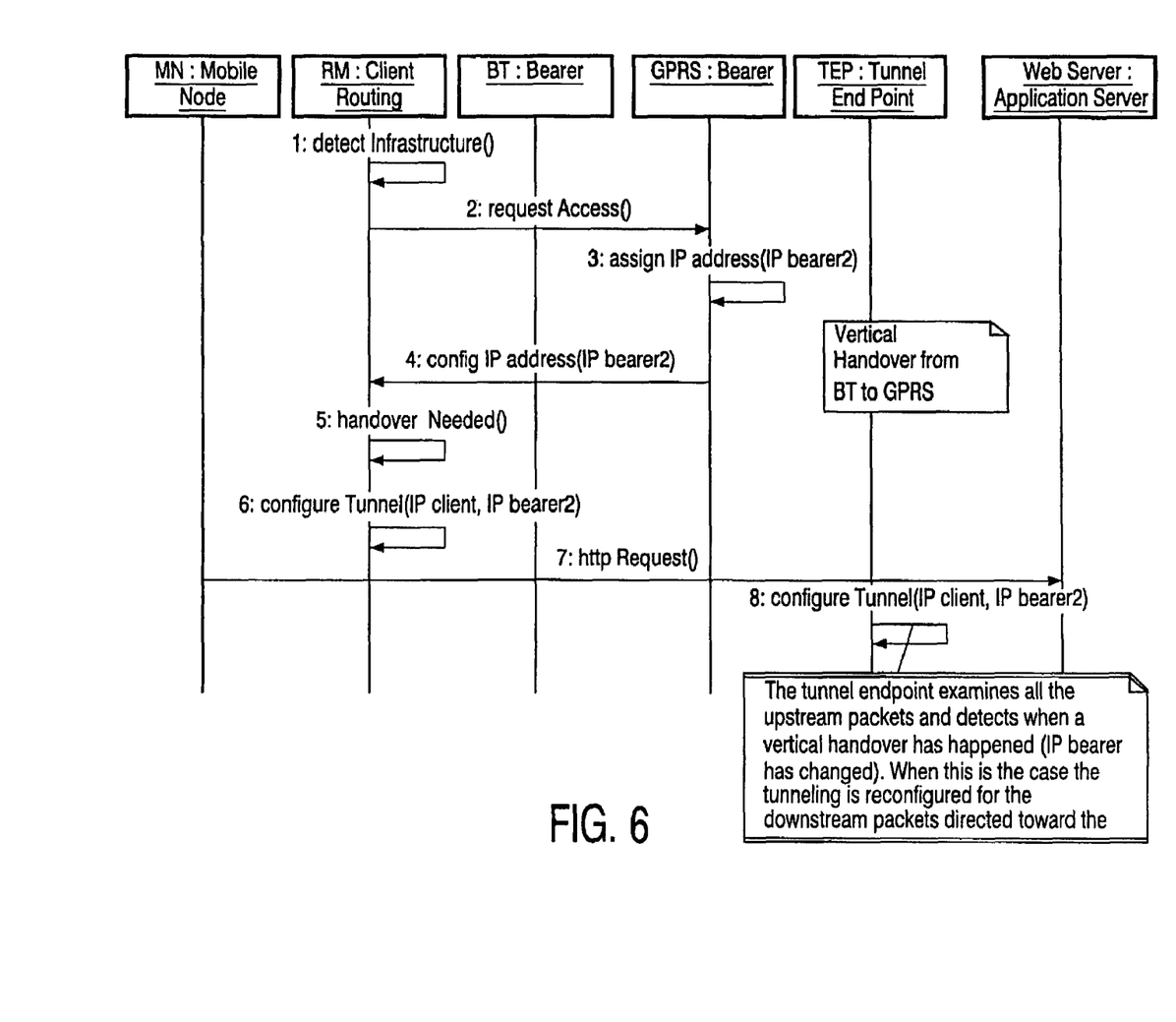
FIG. 6 is a sequence diagram of a vertical handover between communications standards employed in the system of FIG. 1.

When a vertical handover has to be executed, the sequence of operations depicted in FIG. 6 is performed. The example that has been used refers to a mobile terminal MT using Bluetooth™, which exits a building and detects a GPRS network infrastructure.

1. A Routing Manager object (RM) detects that a new wireless infrastructure is available (GPRS) and the lower drivers (DLC) make a Link Layer connection available.
2. An IP_BEARER_2 address is requested to the new detected infrastructure (GPRS network).
3. The GPRS bearer authenticates and decides for the IP_BEARER_2 address to be assigned to the mobile terminal MT.
4. The GPRS interface is automatically configured by means of PPP facilities.
5. If handover is needed,
6. tunnel is re-configured substituting the previous IP_BEARER address (IP_BEARER_BT) with the new one (BT_BEARER_2).
7. Using DIRECT connection to the server 10 (i.e. using the new IP_BEARER_2 address), the mobile terminal MT informs the web-based authentication server that its tunnel re-configuration is needed, using a secure binding update message in the form of a HTTPS request.
8. Web-based authentication server executes a script and updates the Tunnel Endpoint configuration for the mobile terminal MT.
9. It then confirms a successful binding update back to the mobile client.
10. Communication between IP_CLIENT and IP_SERVER is made available again using the new tunnel configuration.

It should be noted that the Tunnel Endpoint should check client activity and, in case no traffic is generated for a specified amount of time, the tunnel should be deleted and the IP_CLIENT returned to the client addresses pool.

The proposed solution therefore provides seamless roaming facilities between different wireless standards and different IP subnets in environments where a mobile terminal MT configuration is entrusted to a properly configured centralized server 10. No requirements are placed on wireless access networks themselves at all. The purpose of the centralized server 10 is to support mobility of clients MT by means of proper configuration of IP tunneling and to provide information retrieval through a common Web interface. Authentication and security mechanisms can also be easily treated in this context. Compared to Mobile IP protocols, the proposed solution is less resource consuming and its implementation simpler.

Security

As far as security is concerned, the following mechanisms are included:

applications are based on a secure data transfer such as Secure Socket Layer (SSL) applied to HyperText Transfer Protocol messages (HTTPS);

location updates are also protected using the same secure data transfer, e.g. HTTPS;

access to the wireless network may be controlled through standard mechanisms (e.g. access points AP connected to a RADIUS server and GPRS SIM based security); and software or hardware firewalls are used whenever the access networks need to connect to the Internet, or other IP-based network as the case may be.

While the present invention has been particularly shown and described with respect to a preferred embodiment, it will

| AAA | Authentication, Authorization and Accounting |
|---|---|
| ARP | Address Resolution Protocol |
| GPRS | Generalized Packet Radio System |
| HTTP | HyperText Transfer Protocol |
| IETF | Internet Engineering Task Force |
| IP | Internet Protocol |
| LAN | Local Area Network |
| MAC | Medium Access Control |
| MT | Mobile Terminal |
| MTU | Maximum Transmission Unit |
| PAN | Personal Area Network |
| RM | Routing Manager |
| TCP | Transmission Control Protocol |
| TEP | Tunnel End Point |
| UDP | User Datagram Protocol |
| WLAN | Wireless Local Area Network |
| WPAN | Wireless Personal Area Network |

The invention claimed is:

1. A communications system comprising:
a) an Internet Protocol compatible communications network;
b) a client device arranged in use to connect to said network in accordance with one of a plurality of communications standards and to change between said communications standards under predetermined circumstances; and
c) a server arranged in use to couple to said network so to communicate with said client device,
wherein said client device and said server are arranged in use to communicate at the network layer through an Internet Protocol tunneling technique, such that an Internet Protocol address of said client device remains the same during a handover from a first said communications standard to a second said communications standard, and wherein said Internet Protocol tunneling technique to form a tunnel encapsulates one Internet Protocol datagram within another Internet Protocol datagram, wherein said client device is automatically assigned a new Internet Protocol address during a vertical handover between two of said communications standards during inter-subnet roaming, and the tunnel is reconfigured by substituting a previous Internet Protocol address with the new Internet Protocol address;
said client device using a direct connection to the server using the new Internet Protocol address to inform the server that the re-configuration of the tunnel is needed, and in response, said server re-configuring the tunnel so that configuration of said client device is entrusted to said server without placing requirements on access networks.

2. A system according to claim 1, wherein said Internet Protocol tunneling technique differentiates between an Internet Protocol address used to connect said client device to a subnet and an Internet Protocol address used to connect said client device to said server.

3. A system according to claim 1, wherein a server endpoint of said Internet Protocol tunneling technique is substantially fixed and a client device endpoint is changeable as a result of roaming.

4. A system according to claim 1, wherein said Internet Protocol tunneling technique maintains one Internet Protocol address for applications and relies on dynamically allocated Internet Protocol addresses for carriage of traffic.

5. A system according to claim 1, wherein network structure of bearers of at least two said communications standards are generally unrelated.

6. A system according to claim 1, wherein said predetermined circumstance initiating a said change between said standards comprises at least one of usage cost, bandwidth availability, received signal strength, link quality, link availability, signal-to-noise ratio, power consumption or user intervention.

7. A system according to claim 1, wherein a transition between two said communications standards is performed with reconfiguration of the network layer.

8. A system according to claim 1, wherein a link layer handover for each of two said communications standards, between said client device and a network unit including an access point, is unrelated at the driver level and said link layer handover is performed independently for each said standard.

9. A system according to claim 1, wherein no new Internet Protocol address is assigned to said client device in the event that the or each network access point used by said client device before and after the vertical handover between two said communications standards belong to the same Internet Protocol subnet, in the event of intra-subnet roaming or in the event of a switch between a Wireless Personal Area Network (WPAN) and a Wireless Local Area Network (WLAN).

10. A system according to claim 1, further comprising a routing manager adapted to monitor which one or more of said communications standards may be employed and to make decisions on switches between communications standards used based on said monitoring.

11. A system according to claim 10, wherein said routing manager makes a said decision on the basis of at least one of an input from a lower layer, on the location of said client device or on user requirements.

12. A system according to claim 10, wherein each said communications standard accesses said network through an individual interface and said routing manager is adapted to deactivate one or more of said interfaces at least temporarily under predetermined conditions, to achieve a power saving.

13. A system according to claim 1, further comprising a security arrangement adapted to allow only authorized client devices to access said network, said security arrangement preferably including one or more of the following:
a) applications based on a secure data transfer such as Security Socket Layer (SSL);
b) location updates protected using a secure data transfer such as Security Socket Layer (SSL) applied to HTTP messages (HTTPS);
c) access to the network is controlled including connecting access points to a RADIUS server and GPRS SIM card based security; and
d) firewalls used whenever access networks for a said communications standard need to connect to the Internet, or other Internet Protocol based network.

14. A system according to claim 1, wherein a said communications standard comprises one of IEEE 802.11b, Bluetooth™ and GPRS.

15. A method of performing communication in an Internet Protocol compatible network, the method comprising the acts of:
a) connecting a client device to said network in accordance with one of a plurality of communications standards and changing between said communications standards under predetermined circumstances;
b) coupling a server to said network for communicating with said client device;

c) communicating between said client device and said server at the network layer through an Internet Protocol tunneling technique to form a tunnel, keeping an Internet Protocol address of said client device the same while handing over from a first said communications standard to a second said communications standard; and wherein said Internet Protocol tunneling technique encapsulates one Internet Protocol datagram within another Internet Protocol datagram, automatically assigning a new Internet Protocol address to said client device during vertical handover between two of said communications standards during inter-subnet roaming;

reconfiguring the tunnel by substituting a previous Internet Protocol address with the new Internet Protocol address;

informing the server, using a direct connection by said client device to the server using Internet Protocol address, that the reconfiguration of the tunnel is needed; and in response to the informing act, reconfiguring the tunnel by said server so that configuration of said client device is entrusted to said server without placing requirments on access networks.

16. A computer readable medium embodying a software product having encoded thereon an executable program when executed by a processor are configured for performing the acts of:

a) connecting a client device to said network in accordance with one of a plurality of communications standards and changing between said communications standards under predetermined circumstances;

b) coupling a server to a network for communicating with said client device;

c) communicating between said client device and said server at the network layer through an Internet Protocol tunneling technique, keeping an Internet Protocol address of said client device the same while handing over from a first said communications standard to a second said communications standard; and wherein said Internet Protocol tunneling technique encapsulates one Internet Protocol datagram within another Internet Protocol datagram;

automatically assigning a new Internet Protocol address to said client device during a vertical handover between two of said communications standards during inter-subnet roaming;

reconfiguring the tunnel by substituting a previous Internet Protocol address with the new Internet Protocol address;

informing the server, using a direct connection by said client device to the server using the new Internet Protocol address, that the reconfiguration of the tunnel is needed; and in response to the informing act, reconfiguring the tunnel by said server so that configuration of said client device is entrusted to said server without placing requirements on access network.

17. A client device for use in a system according to claim 1, said client device being adapted to communicate with said server in accordance with one of a plurality of communications standards and to change between said standards under predetermined circumstances, said communication being performed by means of an Internet Protocol tunneling technique, said client device preferably comprising a mobile terminal such as a Personal Digital Assistant, a lap-top computer or a mobile telephone.

18. A server, for use in a system according to claim 1, said server being adapted to communicate with one or more said client devices in accordance with one of a plurality of communications standards and to control changes between said standards under predetermined circumstances, said communication being performed by means of an Internet Protocol tunneling technique.

* * * * *